(12) United States Patent
Meraw (10) Patent No.: US 6,260,926 B1
(45) Date of Patent: Jul. 17, 2001

(54) ENERGY ABSORBING WEBBING FOR SEAT BELT SYSTEMS

(76) Inventor: Leonard James Meraw, 31733 Belleau Dr., Warren, MI (US) 48092

( * ) Notice: Subject to any disclaimer, the term of this patent is extended or adjusted under 35 U.S.C. 154(b) by 0 days.

(21) Appl. No.: 09/514,931

(22) Filed: Feb. 28, 2000

(51) Int. Cl.$^7$ .................................................. B60R 22/12
(52) U.S. Cl. .......................... 297/468; 280/805; 428/86; 428/201
(58) Field of Search .................................... 297/468, 482, 297/483, 487, 488; 280/805; 428/86, 201

(56) References Cited

U.S. PATENT DOCUMENTS

| | | | |
|---|---|---|---|
| 3,306,662 | * | 2/1967 | Finnigan ............................. 297/482 |
| 3,978,894 | | 9/1976 | Boone . |
| 4,018,478 | | 4/1977 | Fiala et al. . |
| 4,223,917 | | 9/1980 | Mori et al. . |
| 4,243,028 | * | 1/1981 | Puyana ............................... 128/165 |
| 4,513,896 | | 4/1985 | Hirsch . |
| 4,600,626 | | 7/1986 | Ogata . |
| 5,039,168 | | 8/1991 | Baymak et al. . |
| 5,167,263 | | 12/1992 | Helen et al. . |
| 5,322,349 | | 6/1994 | Giano . |
| 5,383,713 | | 1/1995 | Kamiyama et al. . |
| 5,529,343 | | 6/1996 | Klink . |
| 5,722,689 | | 3/1998 | Chen et al. . |
| 5,823,627 | | 10/1998 | Viano et al. . |
| 5,910,457 | | 6/1999 | Kolb . |
| 5,924,773 | | 7/1999 | Kirchhoff et al. . |
| 6,182,874 | * | 2/2001 | Feldman, Jr. ....................... 224/259 |

OTHER PUBLICATIONS

BESI Manufacturing Inc., 9445 Sutton Place, Hamilton OH 85011 online catalog www.besi–inc.com (Jan. 1, 2000) current data.

* cited by examiner

*Primary Examiner*—Peter R. Brown
(74) *Attorney, Agent, or Firm*—Leonard J. Meraw

(57) ABSTRACT

A webbing for seat belt systems having energy absorbing properties comprising a top belt, a bottom belt, and a pair of lateral side seam members nondetachably connecting the belts together. The top belt and bottom belt each have an inner layer facing one another, and contiguous therewith a plurality of contact structures on both inner layers, thereby permitting the contact structures to bear resiliently against one another in an opposing, spaced relationship. During a vehicular collision, the contact structures would absorb deceleration energy and offer user protection against bodily injury. The webbing having energy absorbing properties can be employed in all types of seat belt systems, or be utilized for strapping and belt material.

8 Claims, 7 Drawing Sheets

ENERGY ABSORBING WEBBING FOR SEAT BELT SYSTEMS

BACKGROUND OF THE INVENTION

1. Field of the Invention

The present invention relates to webbing having energy absorbing properties for seat belt systems found in automobiles, aircraft, watercraft and other motorized, or unmotorized, vehicles.

2. Description of Related Art

Seat belts, or safety belts, are commonly employed in all types of motorized vehicles to provide the passenger(s) with protection against striking surfaces during an impact or collision. It is known that serious injuries, and even death, may result from vehicular collisions where the passengers neglect to wear seat belts. Ordinary automobile seat belt systems include a lap belt portion and a shoulder strap portion, the two actually being one in the same belt, however, the underlying user anatomical location determines its respective name. Conversely, seat belt systems, in passenger aircraft, for example, consist of just a lap belt.

Typical webbing for seat belt systems is a continuously woven, flat, single layered fabric approximately 50 mm to 80 mm wide, and approximately 2 mm thick. The actual length of the webbing varies from vehicle design to vehicle design, depending on the required distance between the belt buckle and mounting brackets. U.S. Pat. No. 4,223,917, Mori et al, illustrates such seat belt webbing in a seat belt system.

Baymak et al, in U.S. Pat. No. 5,039,168, disclose a safety seat belt having a non-flat design. Specifically, the belt is made of overlapping fabric creating zones to absorb energy in a collision by the unfolding of the belt.

Another type of seat belt design is the subject of U.S. Pat. No. 5,383,713, Kamiyama et al. Shown therein is an inflatable seat belt having a multi folded cross section. During impact, the belt inflates to provide cushioning against injury.

In the attempt to reduce the damaging impact forces during a collision on passengers utilizing seat belt systems, Kolb, in U.S. Pat. No. 5,910,457, discloses webbing having a characteristic thread complexity which aids in load reduction.

Further, numerous patents introduce load, or force, reduction mechanisms found in conventional seat belt systems, such as, fasteners, latches, buckles and brackets. Respective examples are U.S. Pat. No. 5,722,689, Chen et al, U.S. Pat. No. 5,924,773, Kirchhoff et al, and U.S. Pat. No. 5,823,727, Viano et al.

However, none of the above-mentioned patents, or others referenced in the background sections of these patents, offer a substantial reduction in the energy, formed locally during a collision, or crash, transmitted through the belt into the user's anatomy. Moreover, although numerous attempts have been made to overcome a reduction in the energy formed in seat belt systems during an impact, it appears the related art is still lacking a reliable solution to the primary problem.

SUMMARY OF THE INVENTION

Accordingly, an object of the present invention is to provide a webbing for seat belt systems having energy absorbing properties during an impact.

A further object of the invention is to offer an economically manufacturable seat belt webbing, which would easily adapt to any seat belt system in automobiles, aircraft, watercraft, or the like.

Another object of the invention is to provide webbing which can be readily introduced into conventional seat belt systems with minor revisions to the belt buckle, belt mounting fixtures, and brackets, thereby reducing manufacturing expenses.

Another object of the invention is to provide webbing for seat belt systems, which following an impact, would offer significant protection against bodily injury.

Still further, an object of the invention is to offer some passenger comfort while utilizing the webbing of the present invention due to the resilient nature of the webbing while in normal usage.

Yet another object of the invention is to provide strapping and belt material for various applications, in that the webbing of the present invention can have multiple uses other than in seat belt systems.

In a preferred embodiment of the invention, a webbing comprises a top belt portion, a bottom belt portion, a pair of lateral side seam members, and the webbing has collapsible, resilient internal features capable of absorbing energy during an impact, or collision. The length of the webbing is the same as convention seat belt webbing, so that it can be readily into conventional automotive, aircraft, or watercraft seat belt systems. In another embodiment, the webbing can be introduced into seat belt systems following the simple modification of the belt buckle, mounting fixture, and related peripheral attachment devices in order to accommodate the webbing's thickness, thereby reducing manufacturing expenses.

Other objects, advantages and novel features of said webbing will become apparent from the accompanying drawings, and detailed description of the invention.

DETAILED DESCRIPTION OF THE INVENTION

Figure 1:
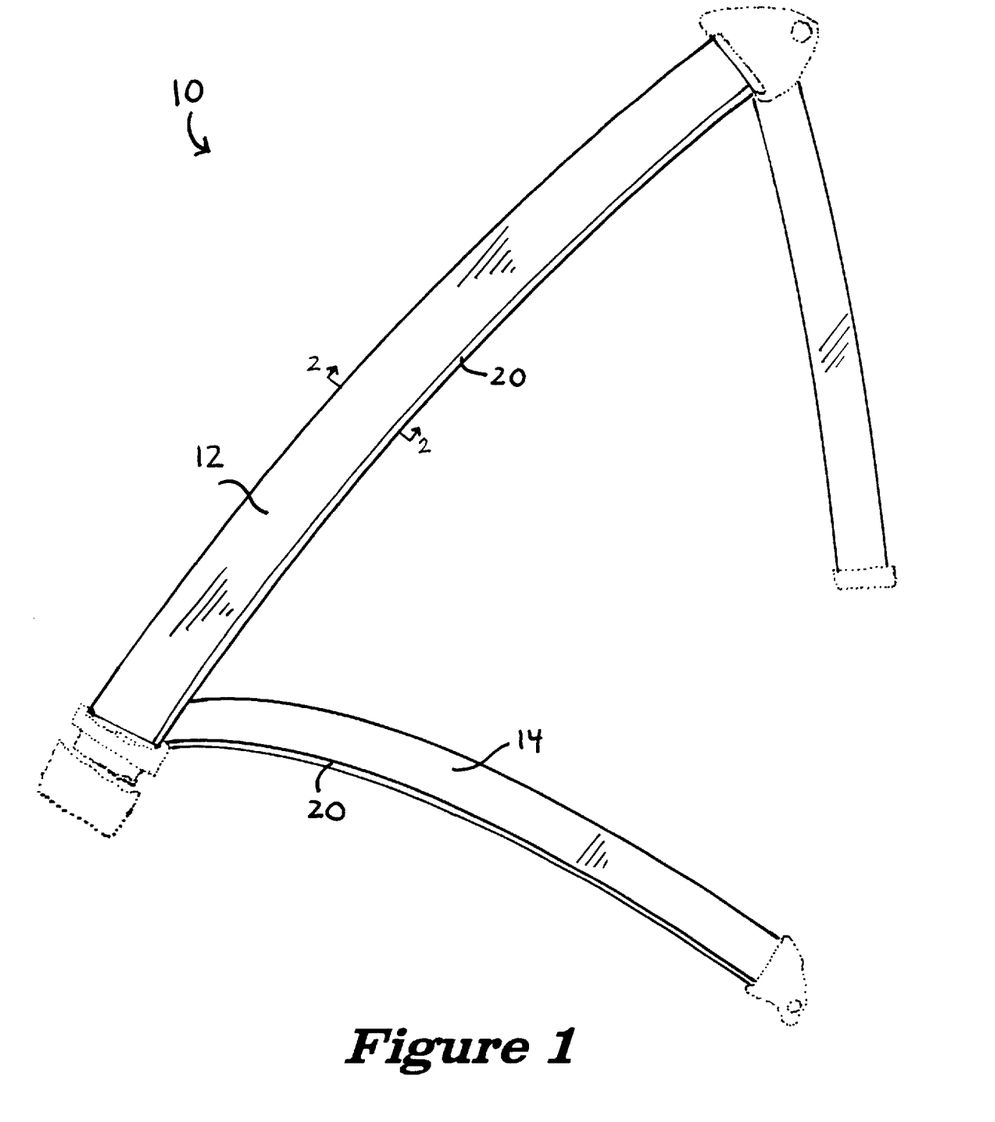
FIG. 1 is a perspective view of an exemplary webbing according to the present invention shown in an automotive seat belt system.

FIG. 1 illustrates a webbing 10 comprising a top belt 12, a bottom belt 14, and a pair of lateral side seam members 20 directly opposite one another; or, alternately, bilateral side seam members. The top belt 12 and bottom belt 14 are slightly spaced apart from one another by the pair of lateral side seam members 20. Each of these features will be discussed in detail here-following. The dotted lines, in FIG. 1, illustrate conventional seat belt system components not apart of the present invention, however, are shown for relationship purposes.

Figure 2:
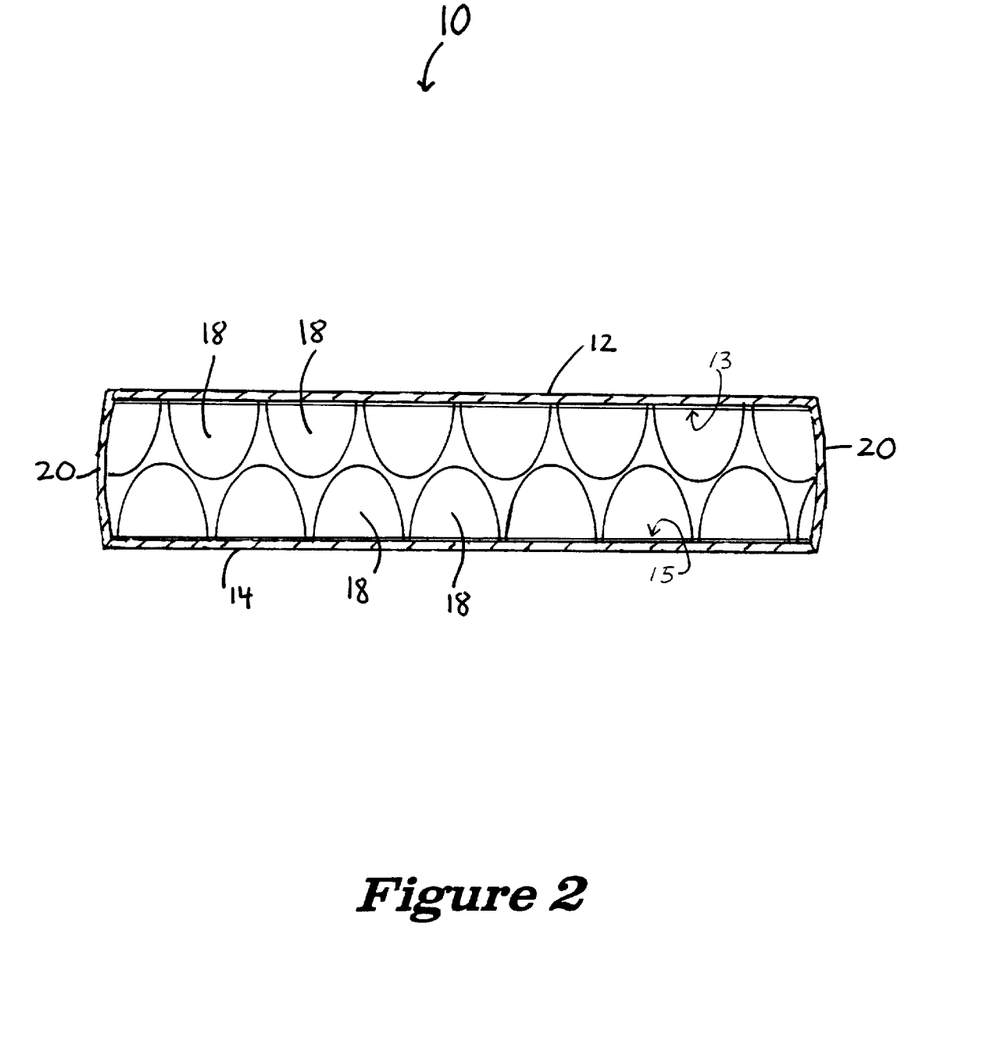
FIG. 2 is a cross-sectional, partially enlarged, view taken along line 2—2 of FIG. 1 illustrating the webbing in an approximate rest position.

In reference to FIGS. 1 and 2, a webbing 10 is shown having a top belt 12, preferably made of conventional woven fabric, and having a bottom belt 14, preferably made of conventional woven fabric. The top belt 12 has an inside bottom layer 13 permanently bonded thereto, and the bottom belt 14 has an inside top layer 15 permanently bonded thereto. Both inside bottom layer 13 and inside top layer 15 are preferably made of conventional flexible materials, cover the approximate same area as their respective attachment belts 12 and 14, and are permanently bonded to their attachment belt via conventional means. The inside bottom layer 13 and the inside top layer 15, which face each other, each comprise a multitude of contact structures 18. The contact structures are an integral part of the inside bottom layer 13 and the inside top layer 15, and the contact structures are perpendicular to inside bottom layer 13 and inside top layer 15. The thickness of layers 13 and 15 is typically the same, however, can be widely varied with regard to the respective thickness of top belt 12 and bottom belt 14.

The top and bottom webbing belts 12 and 14, respectively, are mirror images of one another, and are affixed to one another by the two lateral side seam members 20 via any number of conventional means, which would include, stitched seams extending along the length of both the top and bottom webbing belts 12 and 14, respectively, and the two lateral side seam members 20, as would be seen in either FIG. 1, or FIG. 2. The webbing can be flipped from right side up to upside down, and is thus outwardly and inwardly identical in both appearance and function.

FIG. 2 further illustrates the webbing 10, in a cross sectional, partially enlarged view, in an approximate rest, or completely unstressed position. The contact structures 18 are able to freely move toward and against one another during seat belt usage, and bear resiliently against one another in an opposing spaced relationship, or arrangement. In this view, the inside bottom layer 13 and the inside top layer 15 each are very thin, as indicated with reference numerals.

Figure 3:
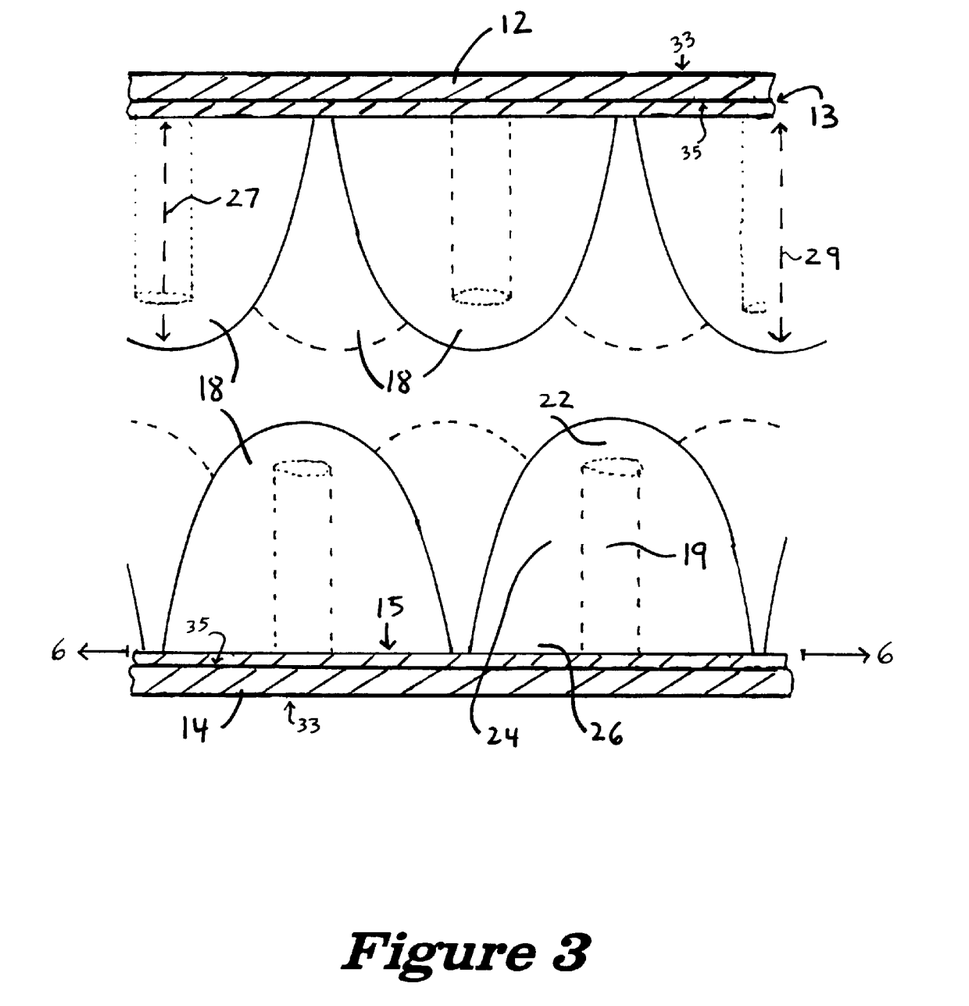
FIG. 3 is a partially exploded, fragmentary, view of the webbing shown in FIG. 2 detailing the interior features of the webbing.

Closer inspection of FIGS. 1 and 2 reveals, that since the top and the bottom webbing belts 12 and 14, respectively, are mirror image of one another, they would have both an outer surface 33 and an inner surface 35, delineated in FIG. 3. The outer surfaces are clearly shown in FIGS. 1, 2, and 3, while the inner surfaces appear in FIGS. 2, 3, and 8.

In FIG. 3, the contact structures 18, most preferably have a partially hollow center 19, as indicated by the dotted lines. The contact structures 18 are positioned in rows parallel to one another on the inside bottom layer 13 and the inside top layer 15. The contact structures 18, on the inside bottom layer 13 and on inside top layer 15, possess a hemi-ellipsoidal shape, as indicated in FIGS. 2 and 3. In addition, the contact structures 18 have a top region 22, a middle region 24, and a base region 26. In addition, each, preferably, hemi-ellipsoidal contact structure has a circular base area 28, shown in FIG. 6, however, not able to be seen in FIG. 3 because of the orientation of the base areas 28 in this view. Further, each alternating row of contact structures has the same base area 28 size, as more vividly seen in FIG. 6 by comparison of a multitude of circular base areas 28, so as to allow for close proximity of the contact structures 18. The, preferably, circular base areas 28 are found within the inside bottom layer 13 and the inside top layer 15, since the contact structures 18 are an integral part of the inside bottom layer 13 and the inside top layer 15. The hollow center 19 of any given contact structure 18 lies along an axis 27 perpendicular to its base area 28. A height 29 of each hemi-ellipsoidal contact structure 18 is the same, as depicted in FIGS. 2 and 3.

The contact structures 18 are made of conventional resilient and flexible materials so as to absorb energy during impact by deformation. Following a given crash or impact, the contact structures 18, and the webbing 10 would return to an original state shown in FIG. 2, and thereby not need to be replaced unless the vehicle's seat belt system, webbing, and related peripheral equipment suffered permanent damage.

Further, the contact structures 18 can have other shapes, such as, cylindrical, hemispherical, pyramidal, or cubical, to mention several examples, and possess the same features as the hemi-ellipsoidal shape, i.e., a top region 22, a middle region 24, and a base region 26 The, flexible, contact structures 18 can be employed within the webbing 10 utilizing a variety of the aforesaid shapes. In addition, the contact structures 18 can have a hollow core or a solid core, or be employed in various combinations of both hollow and solid cores in order to achieve the desired energy absorbing strength of the webbing 10 prior to its introduction into any given seat belt system. Thus, a webbing could result having various geometric shapes with and without hollow centers, or cores. In the clarification of geometric shapes used for the contact structures 18 in the ink present invention, center and core are understood to have the same meaning.

Figure 6:
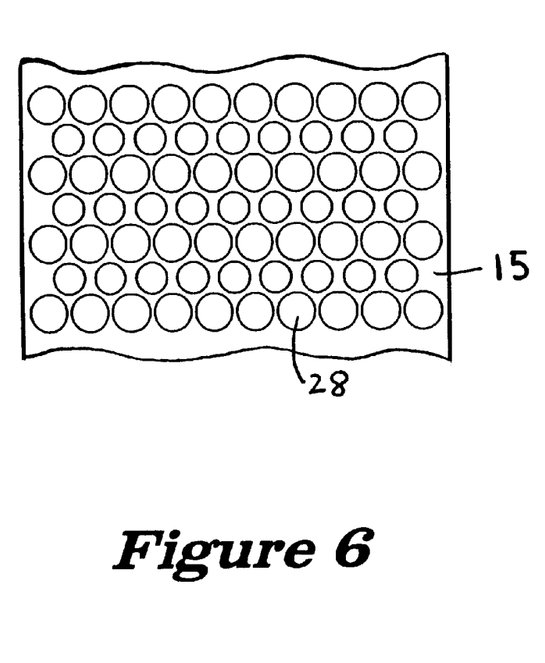
FIG. 6 is a top plan, fragmentary, view of an inside bottom layer of the webbing, taken along line 6—6 of FIG. 3; the inside top layer being a mirror image thereof.

The contact structures 18 on the inside bottom layer 13 and on the inside top layer 15 bear resiliently against one another by being positioned in an opposing, spaced relationship so as to permit the least possible thickness for said webbing 10 having this characteristic multi layer construction. FIGS. 2, 3, and 6 illustrate the proper required lateral spacing distance between the contact structures 18 on the inside bottom layer 13 and on the inside top layer 15 to permit movement of the contact structures 18 during normal usage and during an impact.

Further, the webbing 10 preferably has between seven and ten contact structures 18 across the width of said webbing, as seen in FIGS. 2 and 6. More or less contact structures can be employed in the webbing, depending on the final desired characteristics of the webbing. Since the contact structures 18 are an integral part of the inside bottom layer 13 and the inside top layer 15, it is possible in the manufacture of the webbing that the contact structures 18 might be found in fragmented shapes near the pair of lateral side members 20, as is seen in FIG. 2. However, the slight deformation of the contact structures 18 near the sides of the webbing does not impair their energy absorbing capabilities.

Figure 4:
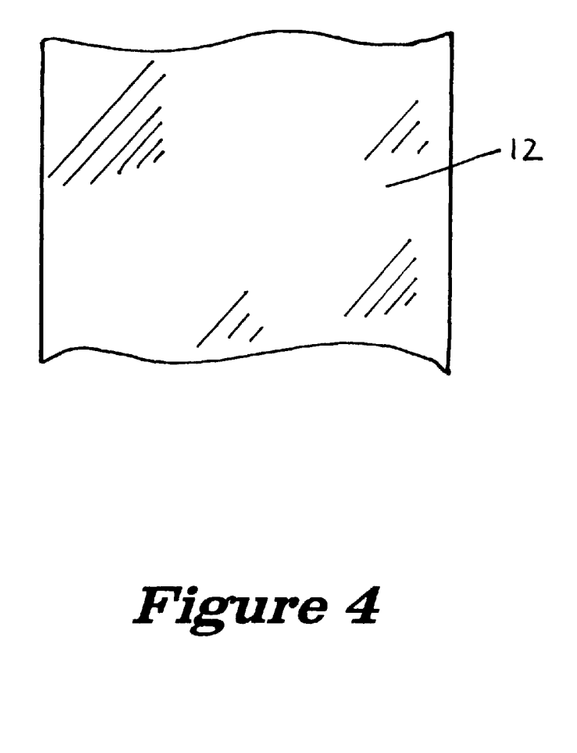
FIG. 4 is a top plan, fragmentary, view of an top, outer surface of the webbing shown in FIG. 1; the bottom, outer surface being a mirror image thereof.

FIG. 4 illustrates a top plan, fragmentary, view of the webbing 10, which preferably comprises conventional woven seat belt fabric. Again, the top and bottom webbing belts 12 and 14, respectively, are mirror images of one another.

Figure 5:
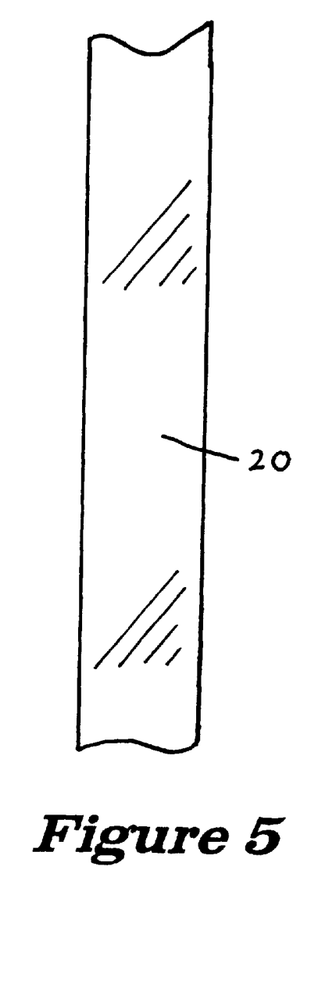
FIG. 5 is a right side, fragmentary, partially enlarged, view of the webbing illustrated in FIG. 1, the left side view being identical thereto.

In FIG. 5, one lateral seam member 20 is shown on the right side of the webbing 10. The left side of said webbing 10 is a mirror image thereof. The two lateral seam members 20 allow for the proper spacing and positioning of the contact structures 18 found within the webbing 10. The lateral seam members 20 can be made from a variety of materials, including, for example, conventional woven seat belt fabric, or non-woven, flexible materials. FIG. 5 is an enlarged view.

Further, FIG. 6, taken along line 6—6 in FIG. 3, shows the relational size of a multitude of base areas 28 of the, preferably, hemi-ellipsoidal, contact structures 18, having a base region 26, covering the outer surface of inside top layer 15, in turn attached to the inside of bottom belt 14. Said contact structures 18 vary proportionally in size along the inside bottom layer 13 and the inside top layer 15, as indicated by the sizes of the base areas 28. In turn the contact structures 18 cover the inside of top belt 12 and the inside of bottom belt 14 by being apart of the outer surfaces of their respective attachment layers, i.e., the inside bottom layer 13 and the inside top layer 15.

Figure 7:
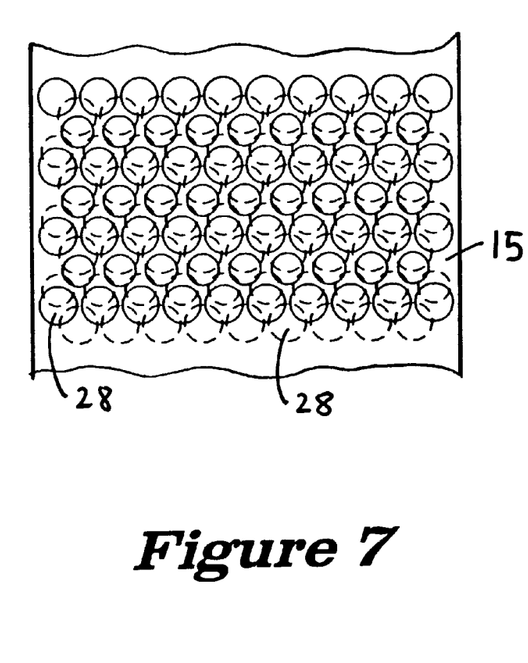
FIG. 7 is a top plan, fragmentary, view of the inside bottom layer of said webbing shown in FIG. 6, however, now illustrating proper alignment of the inside top layer superimposed on said inside bottom layer.

In FIG. 7, a top plan, fragmentary, view of an inside bottom layer 15 of the webbing 10 is shown as in FIG. 6, however, now superimposed is a respective inside top layer 13 having the same base areas 28. Here, the proper position of the contact structures 18, within the webbing 10, positioned in an opposing, spaced relationship, can be visualized in this overlapping surface view, by visualization of the base areas 28, which are contiguous with the inside bottom layer 13 and the inside top layer 15.

Figure 8:
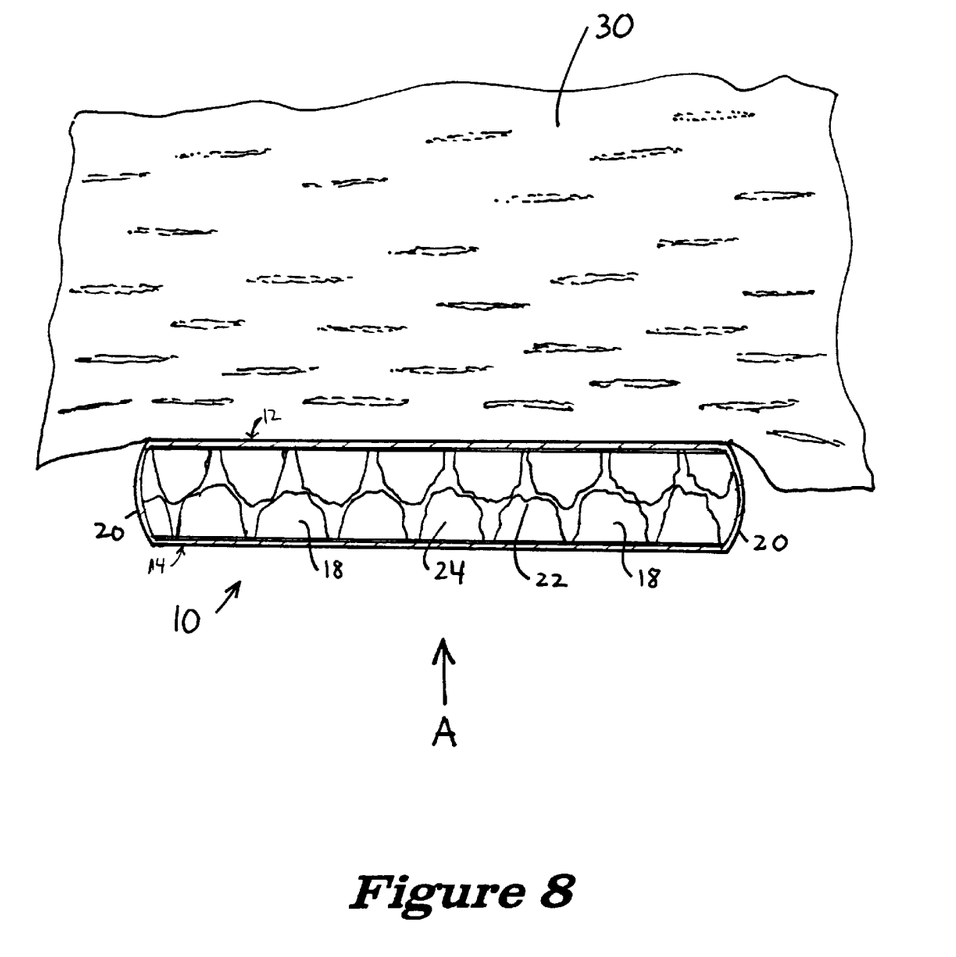
FIG. 8 depicts a cross sectional, partially enlarged, view of the webbing, shown in FIG. 2, yet under a compression load in the direction of force line A.

FIG. 8 depicts a cross sectional, partially enlarged, view of said webbing 10, under a compression load as would occur during both a strong vehicular deceleration and vehicular collision. The inertial force acting upon the webbing 10 is indicated by capital letter A, and is in the direction of the arrow illustrated in FIG. 8. A phantom area 30 behind said webbing 10 would represent human anatomy. During such a collision, the contact structures 18 compress against one another, due to their inherent flexible, resilient nature, and thereby absorb energy resulting from a collision. Moreover, as seen in FIG. 8, the top regions 22 and the middle regions 24 deform, and the pair of lateral side seam members 20 bulge outwardly during an impact. The energy absorbed by the webbing 10 would reduce bodily injury during a crash or collision, because it would reduce the energy available to be transmitted into a user's anatomy and vital organs.

Figure 9:
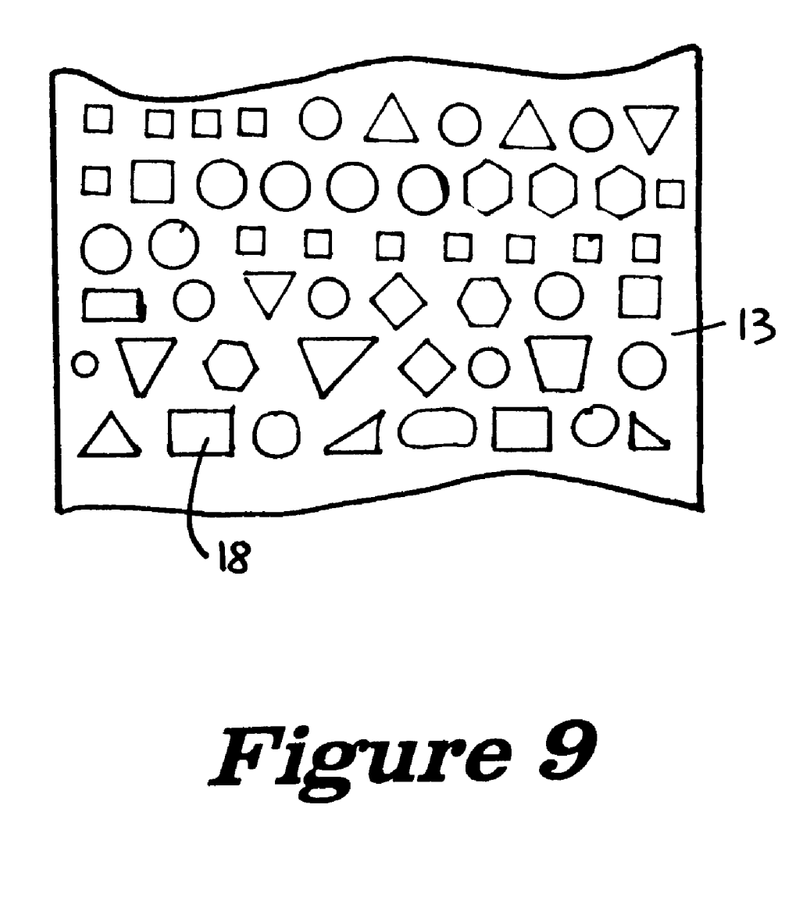
FIG. 9 reveals an alternate embodiment of an inside top layer of the webbing shown in FIG. 6.

In another embodiment of the present invention, FIG. 9 shows that the contact structures 18 can possess a variety of geometric shapes and sizes so as to achieve a desired, final load bearing strength of the webbing 10. Here, an alternate embodiment of the contact structures 18 is shown on the inside bottom layer 13. The contact structures 18 comprise a variety of, somewhat, randomly spaced geometric structures on the inside bottom layer 13. The same shape of contact structures on the inside top layer 15 would be slightly offset from those structures on the inside bottom layer 13 in a webbing application so as to permit close contact of said top belt 12 and said bottom belt 14. Although in the preferred embodiment of the present invention, as seen in FIGS. 2 and 5, where the contact structures 18, in parallel rows of alternating size, are perpendicular to their respective attachment layer 13 and 15, FIG. 9 further illustrates that the contact structures 18 can be spaced and arranged as freely as necessary in webbing production.

Although the inventions has been shown in FIGS. 1–9, and described in detail herein, both are to be considered illustrative and in no way restrictive in nature. Moreover, it is to be understood that only a preferred embodiment has been shown, in addition to several other minor variations, or embodiments of the webbing 10.

The webbing 10 can also be employed as strapping, belt, or harness material in other applications, such as, for example, parachute straps or in wheel chairs, where load bearing properties are sought after in the user material.

One skilled in the art of seat belt webbing, seat belt systems in general, and straps, plus belts, would understand and appreciate changes and modifications to the webbing which would fall within the scope of the present invention.

I therefore claim:

1. A webbing for seat belt systems having energy absorbing properties, comprising:

a top belt having an inner and an outer surface, a bottom belt having an inner and an outer surface, said top belt and said bottom belt nondetachably secured to one another by a pair of lateral side seam members, directly opposite one another, an inside bottom layer, bonded to said inside surface of said top belt, said inside bottom layer having a multitude of contact structures on a side facing said bottom belt; and an inside top layer, bonded to said inside surface of said bottom belt, said inside bottom layer having a multitude of contact structures on a side facing said top belt wherein said contact structures on said inside top layer bear resiliently against said contact structures on said inside bottom layer in an opposing, spaced relationship.

2. The webbing of claim 1 wherein said contact structures have a hemi-ellipsoidal shape, and a center axis perpendicular to said inside top layer and to said inside bottom layer.

3. The webbing of claim 1 wherein said contact structures have a base area contiguous with said inside top layer and said inside bottom layer.

4. The webbing of claim 1 wherein said contact structures have a top region, a middle region, and a base region.

5. The webbing of claim 1 wherein said contact structures have a partially hollow center.

6. The webbing of claim 1 wherein said contact structures vary proportionally in size along said inside top layer and said inside bottom layer.

7. A webbing for seat belt systems having energy absorbing properties, comprising:

a top belt having an inner and an outer surface, a bottom belt having an inner and an outer surface, said top belt and said bottom belt nondetachably secured to one another by a pair of lateral side seam members, directly opposite one another, an inside bottom layer, bonded to said inside surface of said top belt, said inside bottom layer having a multitude of contact structures on a side facing said bottom belt; and an inside top layer, bonded to said inside surface of said bottom belt, said inside bottom layer having a multitude of contact structures on a side facing said top belt wherein said contact structures on said inside top layer bear resiliently against said contact structures on said inside bottom layer in an opposing, spaced relationship, said top belt and said bottom belt being nondetachably secured to said pair of lateral side seam members by a plurality of stitched seams extending along the length of said webbing.

8. The webbing of claim 7 wherein said contact structures have a hemi-spherical shape.

* * * * *